United States Patent [19]

Schall

[11] 4,202,777
[45] May 13, 1980

[54] FLOW DISTRIBUTION MEANS FOR SCREENING APPARATUS

[75] Inventor: Robert A. Schall, Stamford, Conn.

[73] Assignee: Dorr-Oliver Incorporated, Stamford, Conn.

[21] Appl. No.: 353

[22] Filed: Jan. 2, 1979

[51] Int. Cl.² .............................................. B01D 35/22
[52] U.S. Cl. .................................. 210/405; 209/254; 210/421; 210/456
[58] Field of Search .............. 222/537, 536, 561, 560, 222/189; 209/254, 251, 250, 243; 210/456, 247, 305, 306, 405, 421

[56] References Cited

U.S. PATENT DOCUMENTS

| | | | |
|---|---|---|---|
| 3,540,596 | 11/1970 | Bugbee et al. | 210/456 |
| 4,113,626 | 9/1978 | Detcher | 210/456 |
| 4,121,733 | 10/1978 | McRoskey et al. | 222/43 |

Primary Examiner—Frank Sever
Attorney, Agent, or Firm—Burtsell J. Kearns; Harold M. Snyder

[57] ABSTRACT

Flow distribution means for a dewatering screen comprising a nozzle assembly having a rotatable valve and housing assembly extending transversely of the feed end of the screen. Manual or automatically operable actuator means are interconnected to the valve for controlling movement thereof to vary the size of the spout opening of the nozzle and for providing rapid opening of the spout for purging the nozzle assembly.

9 Claims, 10 Drawing Figures

FLOW DISTRIBUTION MEANS FOR SCREENING APPARATUS

BACKGROUND OF THE INVENTION

The present invention is directed to dewatering screen devices and in particular to such screen devices utilizing a pressurized feed input.

Dewatering screen devices are well known and comprise screen surfaces mounted in housings to which a liquid-solids slurry is fed for separation of the solids from the liquids on the screen surface. In one type of dewatering screen device the screen comprises a highly polished concave curved screen surface or deck having an arcuate configuration formed to a configuration of a 120° arc segment of a circle. The screen surface is comprised of a plurality of equidistantly spaced and parallel transverse separating bars having slot openings of 50 to 150 micron size range formed therebetween. The slurry is fed in a substantially tangential direction to the concave side of the screen surface at a relatively high pressure through spaced feed nozzles. Oversize material travels around the screen surface and is discharged from the device through an overflow outlet pipe. The liquid portion of the slurry together with fines pass through the slots in the screen surface and are discharged through an underflow outlet at the rear of the screen.

These dewatering screens have met with wide success and are essentially free from maintenance cost in view of the simplicity of the design and minimum number of moving parts. In particular the screens are extensively used for high capacity fine separation of fibrous non-abrasive solids in the pulp and paper industry where the screens are used for many process purposes, such as for example, as saveall or in fiber recovery. Although the screens are highly effective, inconveniences are present in certain applications in view of known feed nozzle arrangements. The most common nozzle arrangements for these pressure feed devices comprise a plurality of nozzles attached to the upper portion of the unit housing at spaced intervals for dispersing the feed to the screen surface. In operation of the screen unit the orifices of the nozzles will intermittently clog requiring the interruption of the operation of the unit for cleaning. Further, although the nozzles are effective in use they often result in a lack of full utilization of the screen surface due to the spacing of the nozzles which causes intermediate blind areas across the screen. This is especially noticeable at the opposite sides of the screen where a splashing effect is generated which result in a loss of separation effectiveness in those areas of operation.

In other known dewatering screen devices such as for example those described and disclosed in British Pat. No. 829,860 and U.S. Pat. Nos. 2,995,245; 3,353,674 and 3,452,876 feed inlet arrangements for screen surfaces are disclosed which comprise movable flaps or displaceable wall surfaces which direct the flow onto the screen. The wall surfaces are adjustable either by the flow of the material or manually to vary the distance between the wall surface and the screen. These arrangements although sufficient for their intended purposes are not concerned with controlling the velocity of the feed flow to the screen surface at relatively high pressure feed rates.

It is an object of the present invention to provide a novel flow distribution means for a dewatering screen.

Another object is to provide a novel nozzle and feed spout arrangement for a liquid-solids separating screen which allows for full utilization of the separating screen surface of the unit.

Another object is to provide a novel nozzle and feed spout for dewatering screen unit having readily operable means for opening the feed spout to permit cleaning of the nozzle assembly upon clogging thereof.

Another object is to provide a novel dewatering screen which allows for rapid purging of the nozzle assembly in case of clogging and which includes means for controlling the velocity of the feed during purging.

A further object is to provide a novel nozzle assembly having means for adjusting the size of the spout opening through infinitely variable settings in accordance with the flow of the feed slurry.

A still further object is to provide a novel nozzle and spout arrangement for dewatering screen which is adapted for automatic operation for selective intermittent opening and closing of the spout to assure proper functioning of the nozzle during operation of the dewatering screen.

SUMMARY OF THE INVENTION

The present invention contemplates a novel flow distribution and control means for dewatering screen which comprises a novel nozzle and spout assembly mounted at the feed end of a concave screen surface for receiving a pressurized feed of a solid-liquid slurry. The nozzle assembly includes a housing extending transversely of the screen and provided with an internal rotatable valve member. The valve member is formed with spaced longitudinally extending inlet and outlet slots in communication respectively with the slurry feed inlet and nozzle discharge spout. An actuator rod is interconnected to the valve means and is adjustable to simultaneously vary the size of the spout and valve openings. In one embodiment the actuator rod is held in adjusted position by readily detachable clamp means whereby the actuator rod may be released to fully open the nozzle spout for rapid purging of the valve assembly upon clogging.

The above and other objects and advantages of the present invention will appear more fully hereinafter from a consideration of detailed description which follows taken together with the accompanying drawings wherein two embodiments of the invention are illustrated.

DETAILED DESCRIPTION

Figure 1:
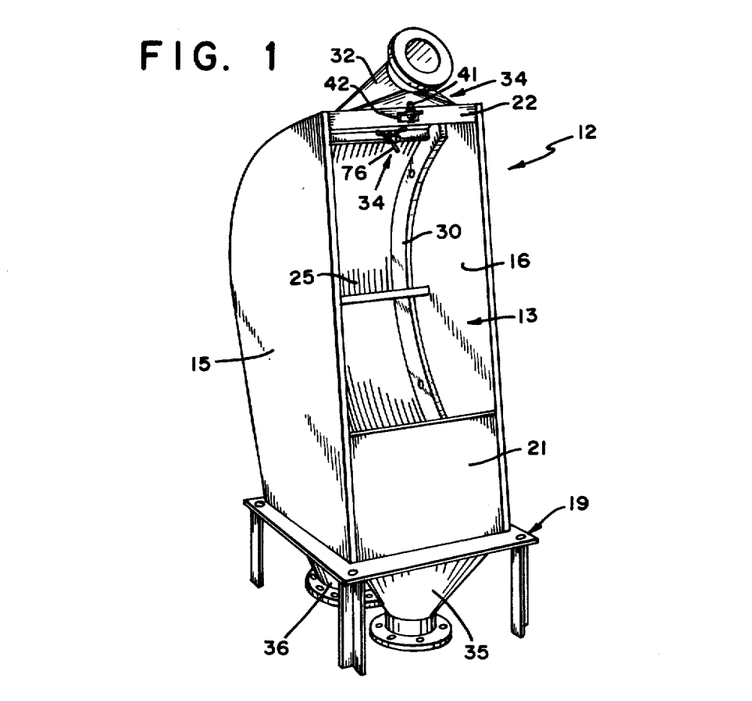
FIG. 1 is a front perspective view of a dewatering screen unit in which is incorporated an embodiment of the present invention.
Figure 2:
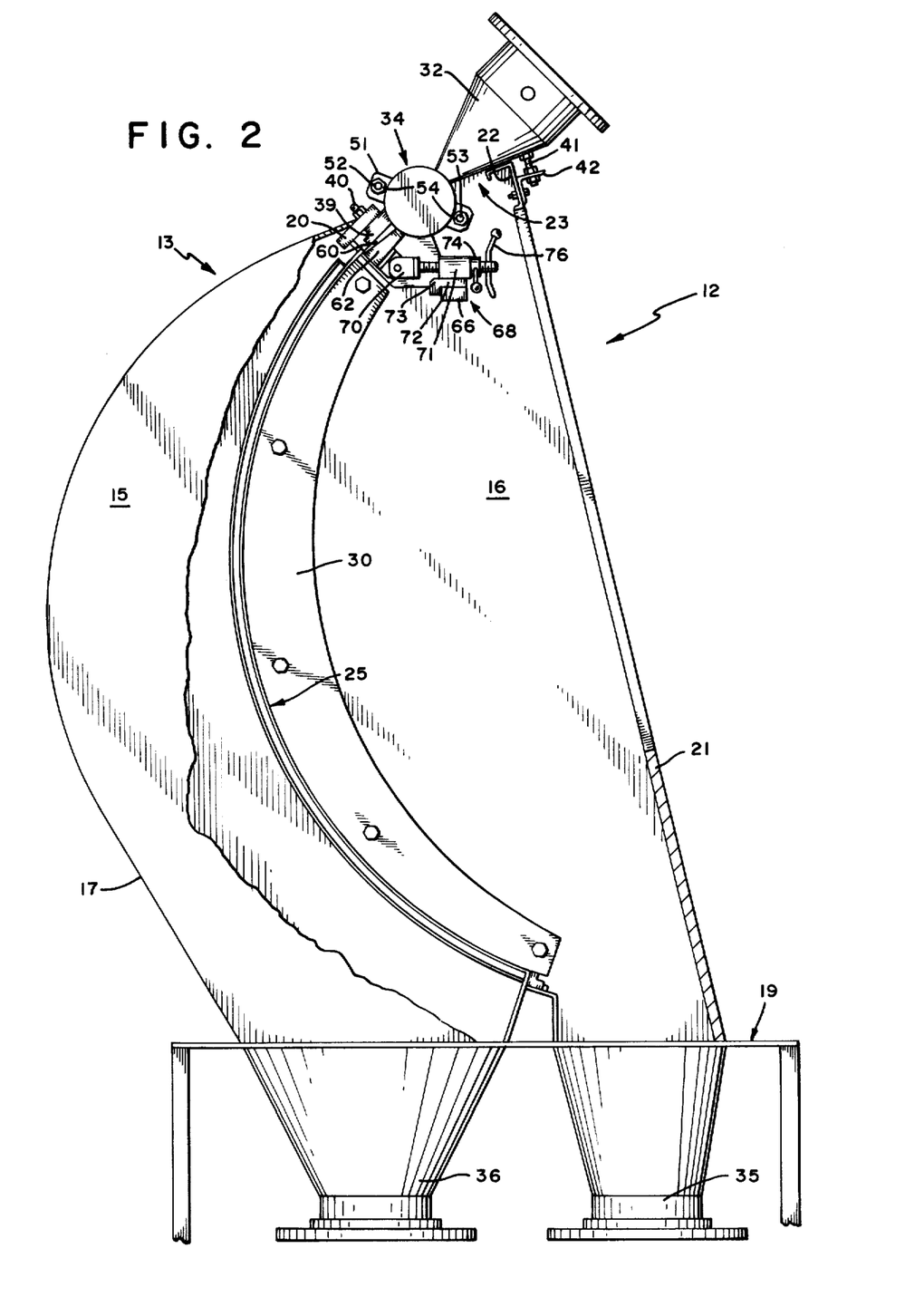
FIG. 2 is a side elevational view of the dewatering screen of FIG. 1 with parts of the housing broken away to show the interior thereof.

Referring now to the drawings for a more detailed description of the present invention, and more particularly to FIGS. 1 and 2, a dewatering screen unit which incorporates one embodiment thereof is generally indicated by the reference numeral 12. Screen unit 12 includes a main housing 13 having spaced sidewalls 15 and 16 respectively and a rear wall 17 which are suitably secured to a support stand 19. Rear wall 17 of housing 13 extends in an arc from stand 19 to the top of housing 13 and is secured to a bracing member 20 interconnected to sidewalls 15 and 16. A plate 21 extends across the lower portion of housing 13 at the front thereof and an L-shaped flanged member 22 extends across the top of housing 13 with the opposite ends thereof interconnected to sidewalls 15 and 16 in a suitable manner. An opening 23 is provided at the top of housing 13 between bracing mmember 20 and flanged member 22 (FIG. 2).

Figure 3:
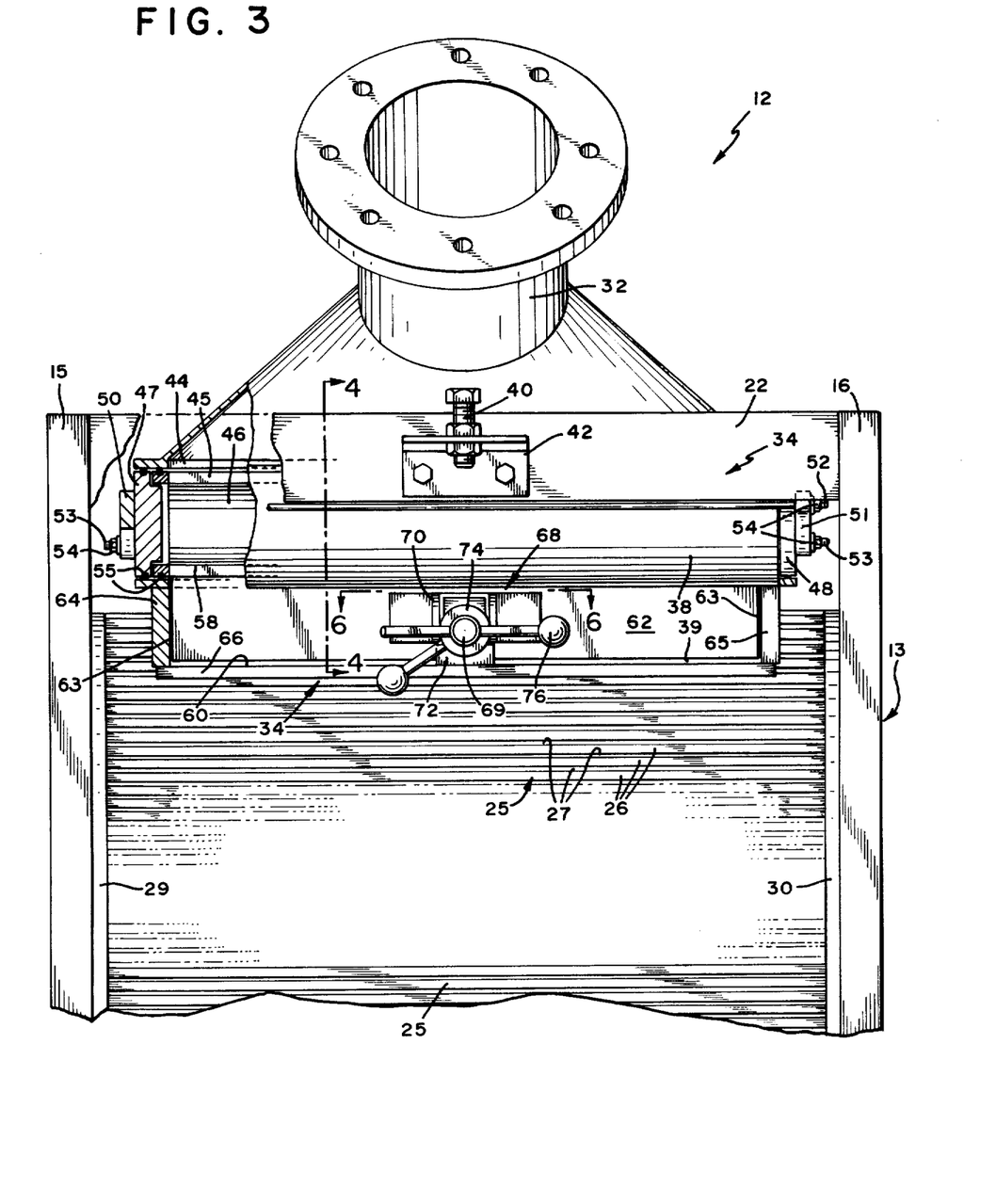
FIG. 3 is an enlarged front elevational fragmentary view of the upper portion of the dewatering screen.

A screening deck comprising a curved screen or sieve bend 25 is located in unit 12 and is formed to the configuration of a 120° arc segment of a circle (FIG. 2). Screen 12 includes a plurality of transverse wedge bars 26 (FIG. 3) which are equidistantly spaced about the arc of screen 12 and between which bars 26 are provided discharge slots 27. Screen 12 is of a well known type construction such as that shown and disclosed in U.S. Pat. No. 2,916,142 issued to F. J. Fontein. As will be hereinafter fully appreciated, however, the present invention is not limited to the particular screen surface disclosed and different screen surfaces may be used if desired.

Screen 25 is supported in arcuate shape between sidewalls 15 and 16 by arcuate end plates 29 and 30 (FIGS. 2 and 3) secured to sidewalls 15 and 16. Screen 25 is attached to end plates 29 and 30 in a manner not shown by any suitable releasable fastening means in order that the screen surface may be replaced or reversed 180° in position in housing 13 as needed. A slurry feed input pipe 32 is located at the top of housing 13 and is adapted to receive a feed solids-liquid slurry and transmit it to a nozzle assembly 34 for tangential distribution to screen surface 25 whereat the solids are separated from the slurry by wedge bars 26 and carried along the surface of screen 25 to an overflow discharge outlet 35 at the base of housing 13 in a usual manner. Concurrently liquids and fines are separated by wedge bars 26 and are passed through discharge slots 27 for discharge from unit 12 through an underflow discharge outlet pipe 36.

Figure 4:
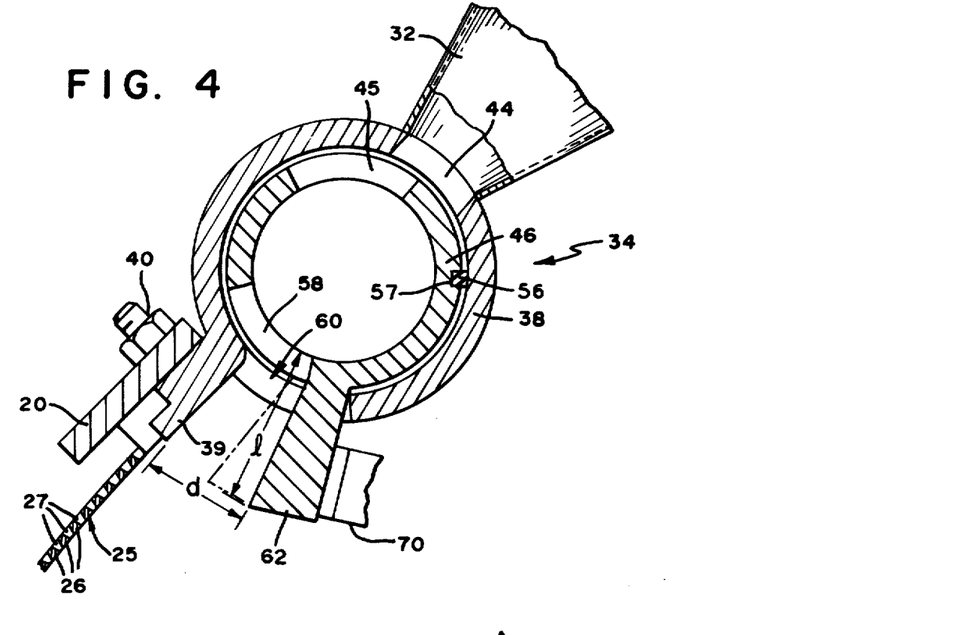
FIG. 4 is a transverse sectional view of the nozzle and spout assembly taken along the line 4—4 of FIG. 3 and shows the valve and spout assembly in open position.
Figure 7:
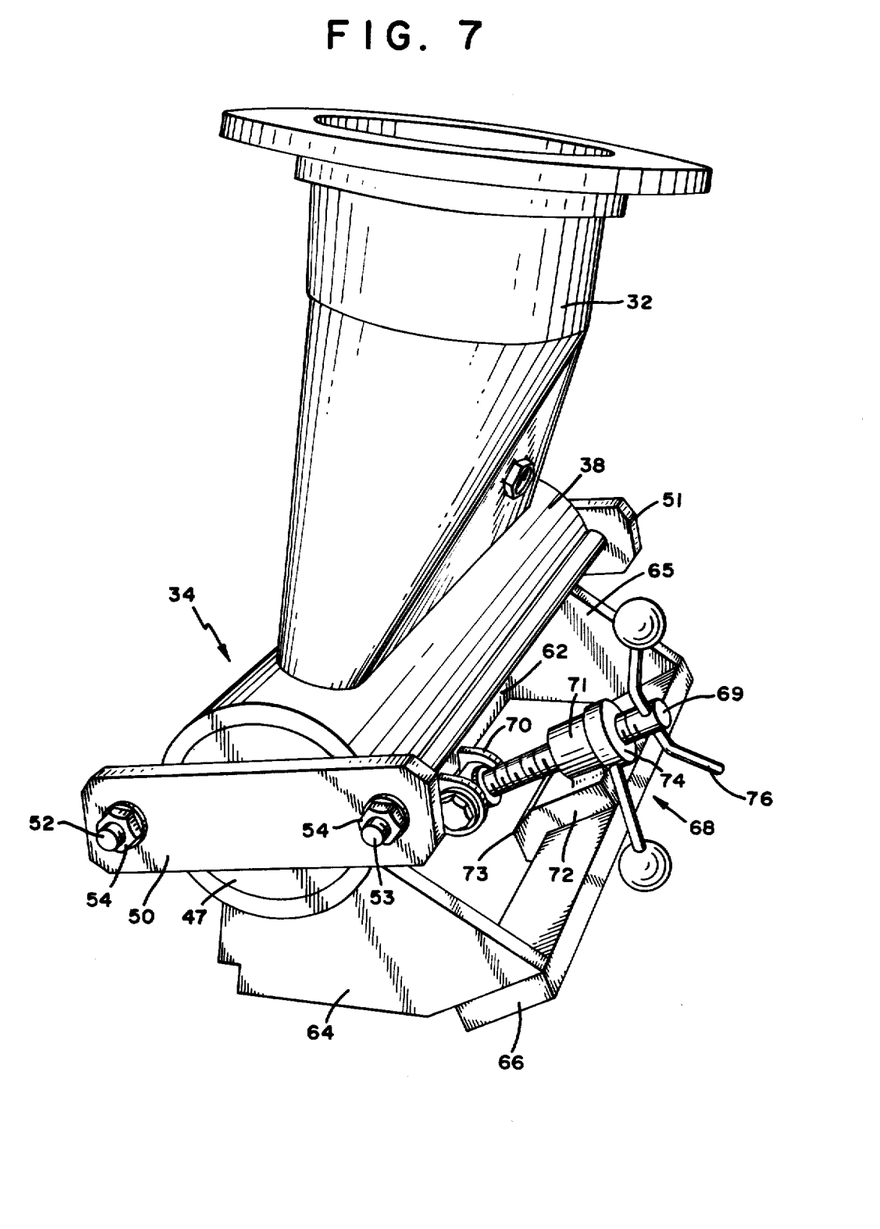
FIG. 7 is a perspective view of the nozzle and spout assembly removed from the dewatering screen unit.

As mentioned it is the feature of this invention to provide a novel nozzle assembly for controlling the flow distribution of the solids-liquid slurry to the dewatering screen surface. To this end nozzle assembly 34 (FIGS. 1, 2 and 3) is mounted in unit 12 within opening 23 between flange members 20 and 22 respectively. Nozzle assembly 34 includes a cylindrical outer housing 38 (FIG. 4) having a depending rear wall 39 bolted to bracing member 20 of housing 13 by a plurality of bolt and nut connections one of which is indicated by the reference numeral 40 in FIGS. 4 and 5. Feed input pipe 32 forms part of nozzle assembly 34 and extends across the top of outer housing 38 (FIG. 7) thereof. A drawbolt 41 (FIG. 2) is interconnected to a bracket 42 on flange member 22 and feed pipe 32 to support and brace nozzle assembly 34 in housing 13.

Feed input pipe 32 is formed with an elongated discharge orifice 44 which extends longitudinally of cylindrical nozzle outer housing 38 and which orifice 44 is in communication with a corresponding inlet slot opening 45 in a rotatable cylindrical control valve 46 arranged within outer housing 38. The opposite ends of valve 46 are rotatably seated in spaced end bearing plates 47 and 48 fitted in housing 38. Rectangular shaped end blocks 50 and 51 are welded to the outer surfaces of end plates 47 and 48 with tie rods 52 and 53 interconnected to blocks 50 and 51. The tightening of nuts 54 on tie rods 52–53 causes the blocks 50 and 51 to frictionally engage the outer surface of the ends of nozzle housing 38 to maintain end bearing plates 47 and 48 in fixed position therein. Suitable sealing O-rings 55 are located about the peripheries of end bearing plates 47 and 48 and about the ends of rotatable valve 46 to seal the opposite ends of nozzle assembly 34. In addition an elongated sealing strip 56 (FIGS. 4 and 5) is fitted in a longitudinally extending channel 57 in the exterior surface of valve 46 to further seal the interior of housing 38.

Flow control and distribution means are provided in nozzle assembly 34 and include the said longitudinal inlet slot 45 and a spaced outlet slot 58 in rotatable valve 46. Inlet slot 45 is positioned relative to feed discharge orifice 44 of feed pipe 32 while outlet slot 58 is positioned at the base of nozzle 34 in communication with longitudinal discharge opening 60 in outer housing 38. The spout of nozzle assembly 34 includes a wedge shaped wall member 62 which depends from valve 46 and projects outwardly of discharge opening 60. Wall member 62 extends longitudinally of nozzle assembly 34 and together with wall 39 of outer housing 38 form a spout for controlling the velocity of flow of slurry to the screen surface 26. The opposite ends of spout wall 62 (FIG. 3) are provided with seals 63 which engage the walls of spaced end brackets 64 and 65 to prevent the slurry from discharging or spurting outwardly of the sides of nozzle 34. It has been found that by predetermining the length designated "1" in FIG. 4 of spout wall 62 and selectively varying the distance designated "d" between walls 62 and 39 an effective distribution of the feed slurry uniformly across the surface of screen 26 is achieved.

As will be appreciated rotation of inner valve 46 will vary both the size "d" of the spout opening 60 and simultaneously the opening between feed discharge orifice 44 of pipe 32 and inlet opening 45 in valve member 46. Means are therefore provided to control the rotation of valve member 46. To this end outer housing 38 of nozzle assembly 34 is provided with the mentioned depending spaced end brackets 64 and 65 which are of triangular shaped configuration. A support bar 66 extends across the front of nozzle assembly 34 (FIG. 3) and has opposite ends secured to brackets 64 and 65.

An actuator assembly 68 for valve member 46 includes a threaded actuator rod 69 pivotally mounted at one end to a clevis member 70 which is secured to the outer surface of spout wall 62. A cylinder collar 71 is threaded about rod 69 and has a clamp portion 72 depending therefrom. In a fixed position of spout 62 relative to wall 39 clamp end 73 of clamp 72 engages support bar 66. A locking nut 74 is threaded about actuator rod and releasably locks collar 71 and clamp 72 to bar 66. In this position handle 76 at the free end of actuator rod 69 may be rotated whereby actuator rod 69 is in turn rotated within collar 71 to move in a linear path causing valve member 46 to be rotated within housing 38 to vary the size of both the joint opening between valve inlet opening 45 and orifice 44 of pipe 32 together with the size of spout opening 60.

Figure 5:
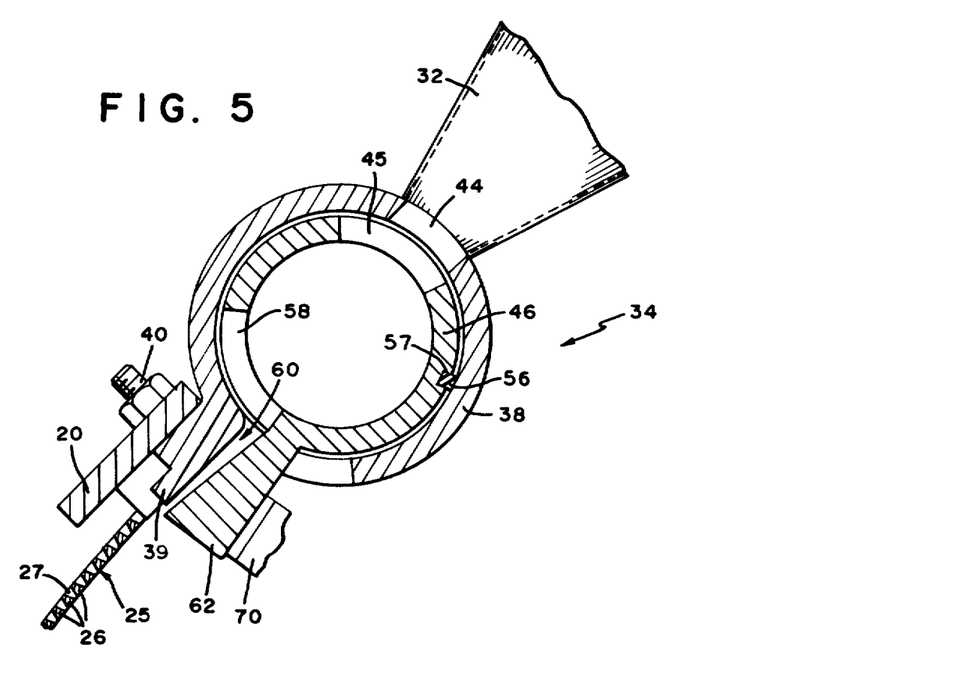
FIG. 5 is a view similar to that of FIG. 4 and shows the valve in the operative or partly closed position.
Figure 6:
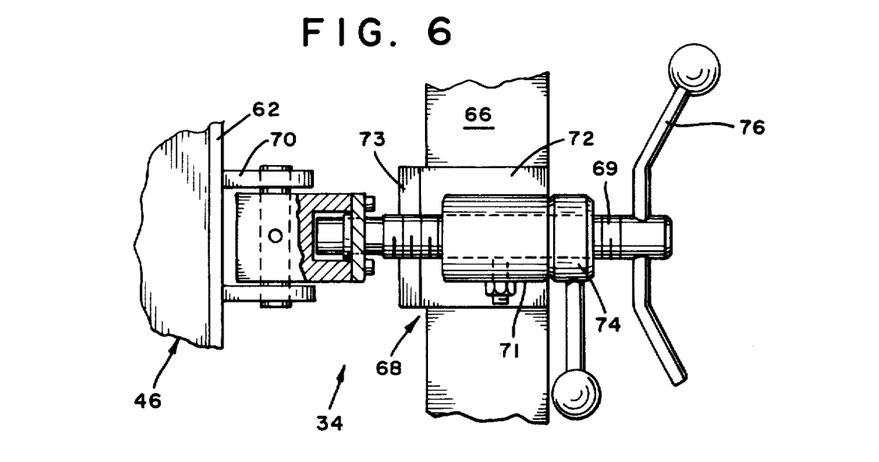
FIG. 6 is a sectional view taken along the line 6—6 of FIG. 3.

In operation of screen unit 12 nozzle assembly 34 and actuator rod 69 are normally in the position shown in FIG. 5 with valve inlet slot 45 fully open to permit full pressure feed from orifice 44 of input pipe 32 to nozzle assembly 34 for discharge through the narrowed spout opening 60. It has been found in one operative embodiment of the present invention that the spout opening 60 in operative condition has a size "d" of approximately 0.187 inches. In this manner the flow of liquid slurry from nozzle 34 to screen surface 26 is uniformly distributed across the surface thereof. If during operation of screen unit 12 nozzle assembly 34 becomes clogged, as for example with fibrous material, spout opening 60 can be rapidly widened to increase the size distance "d" to approximately 1.50 inches. To accomplish the latter locking nut 74 on actuator rod 69 is released to free collar 71 and clamp 72 from bar 66. As clamp 72 is freed valve member 45 under the pressure of the input feed is caused to rotate counterclockwise (FIG. 5) to an open spout position of approximately 0.50 inches as indicated in broken lines in FIG. 4. In the latter position inlet opening 45 in valve 46 is closed substantially to increase the input feed velocity from input pipe 32 to valve 46 to purge the interior thereof with the feed flow decreased to prevent undue splashing of the slurry on screen 26. If desired spout wall 62 may be moved to a fully open position shown in solid lines in FIG. 4 by manual rotation thereof.

Figure 8:
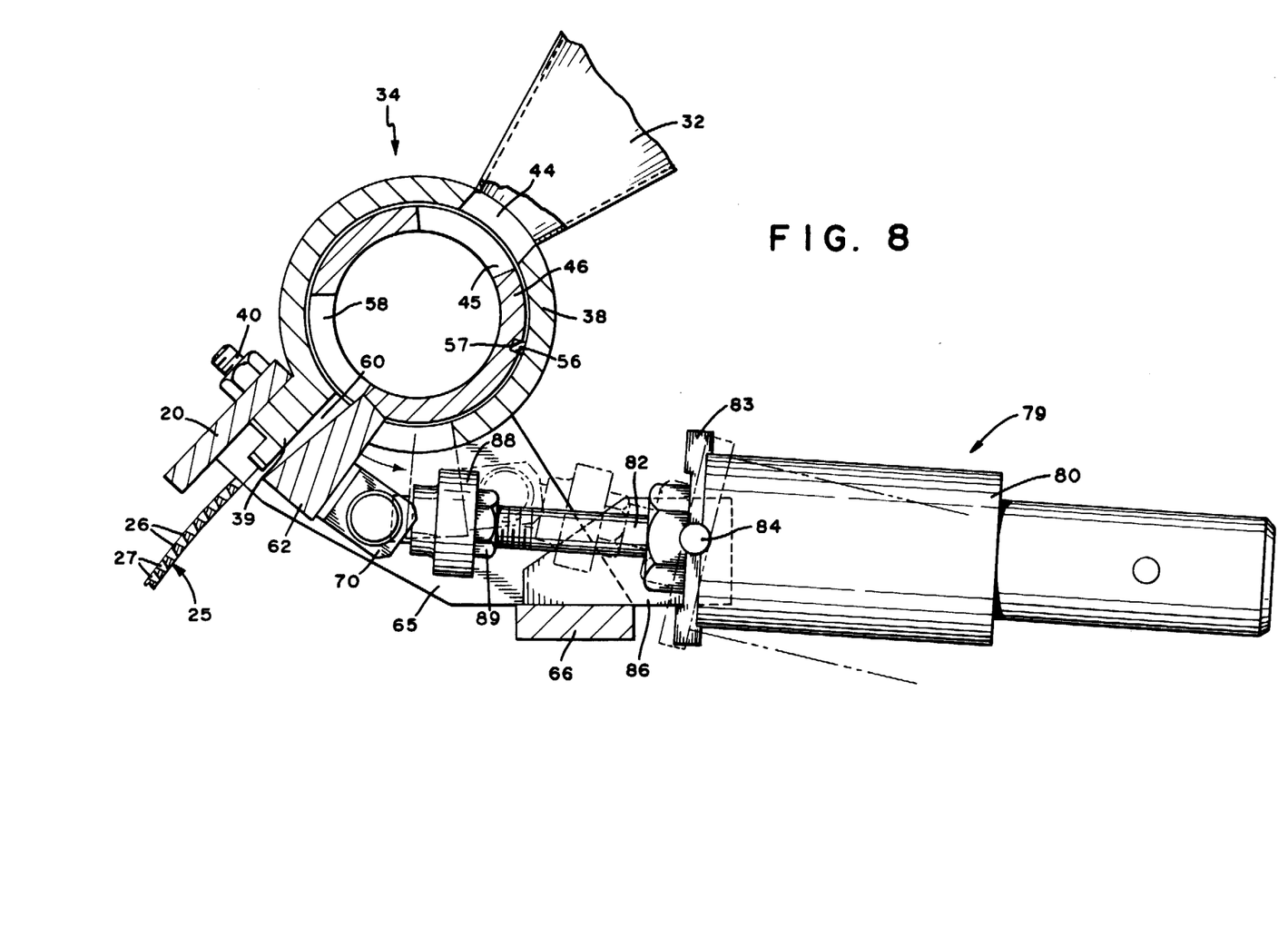
FIG. 8 is a cross-sectional partly fragmentary view of the nozzle assembly and another embodiment of the actuating means therefor.
Figure 9:
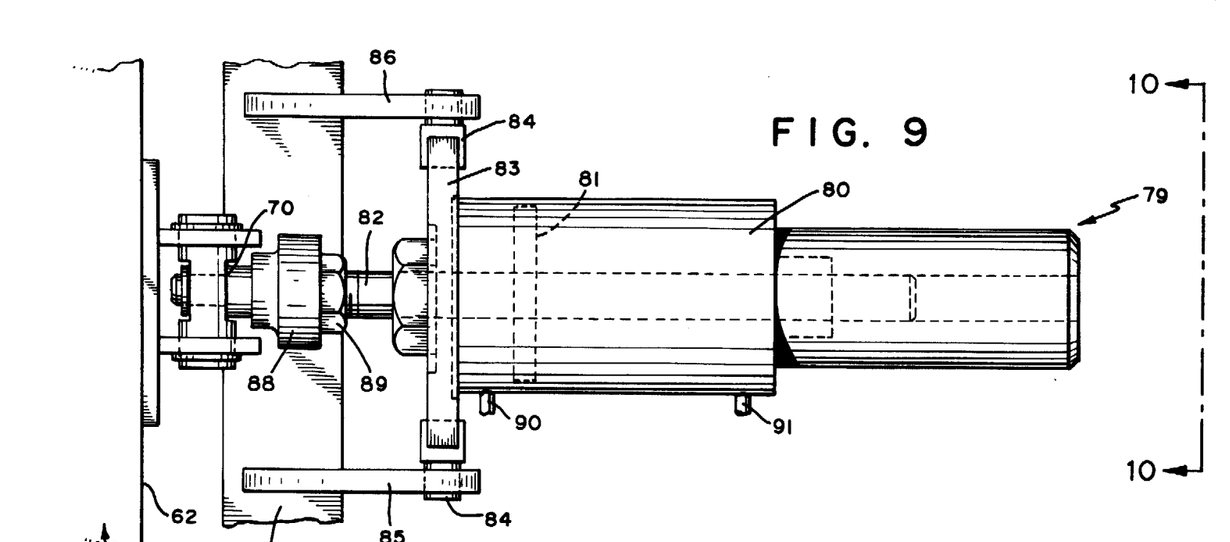
FIG. 9 is a plan view of the actuating means of FIG. 8.
Figure 10:
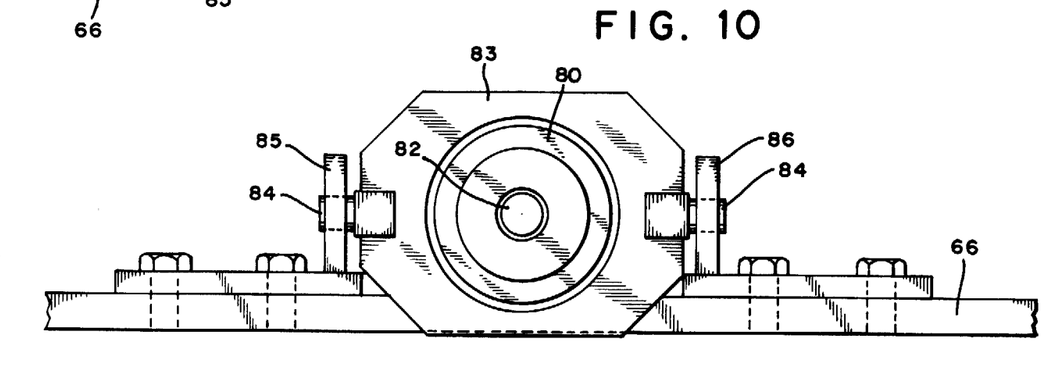
FIG. 10 is an end view taken along the line 10—10 of FIG. 9.

In FIGS. 8 to 10 is illustrated another embodiment of the present invention wherein the nozzle assembly 34 is adapted for automatic or sequentially timed controlled operation. In this embodiment the same structure as the embodiment of FIGS. 1 to 7 is utilized except that the actuating means for valve assembly 46 are changed and corresponding reference numerals have been applied to like elements previously described. In this embodiment a pneumatic piston 79 is provided and comprises an outer casing 80 and an inner piston 81 and rod 82 assembly. Casing 81 is secured to a bracket 83 which is provided with spaced pinions 84 pivotally mounted in spaced trunnion brackets 85-86 secured to bar 66.

Piston rod 82 projects outwardly of casing 80 and is connected in driving relationship with spout wall 62 of valve 46. To this end the projecting end of rod 82 is threaded in adjusting nut 88 which is pivotally connected to clevis 70 secured to wall 72. Rotatable adjustment of nut 88 will cause rod 82 to move outwardly of casing 80 to set the spout opening at a desired distance "d" (FIG. 5). Locking nut 89 is then tightened to fix rod 82 at the desired setting in adjusting nut 88.

Pneumatic piston 80 is adapted to be connected to a suitable pneumatic source (not shown) via connections 90-91 in a usual manner whereupon piston 81 may be driven to cause rod 82 to be reciprocated and move wall 62 to rotate valve 46 between an open position (broken lines FIG. 8) to operative position (solid lines FIG. 8) in accordance with the directional movement of piston rod 82. As piston rod 82 is moved between said positions piston 78 will be pivoted on pinions 84 as is also indicated by broken lines in FIG. 8. The pneumatic source may be connected to any suitable control means for timing the sequence of operation of piston 80 to periodically open spout 60 to purge the nozzle assembly in accordance with the type slurry being processed by the screen unit 12.

It is apparent from the foregoing that the novel nozzle assembly 34 has many advantages in use. One advantage is that the assembly is adapted for either manual or automatic operation. In addition means are provided for rapidly opening and closing the spout assembly and for varying the size of the valve openings. The arrangement of the nozzle and spout assembly relative to the screen surface results in a full distribution of the inlet feed across the screen surface without undesirable blind spots or buildup of liquid along the sides of screen unit.

Although two embodiments of the present invention have been illustrated and described in detail it is to be expressly understood that the invention is not limited thereto. Various changes can be made in the design and arrangement of parts without departing from the spirit and scope of the invention as the same will now be understood by those skilled in the art.

What is claimed is:

1. A screen unit for separating solids from a liquid-solids slurry, comprising
   (a) a screening surface having a plurality of discharge openings,
   (b) spaced outlets for respectively receiving solids overflow from said screen surface and liquid underflow from said discharge openings,
   (c) feed input means for receiving a liquid-solids slurry for discharge to said screen surface,
   (d) nozzle means interposed between said feed input means and said screen surface for distributing and controlling the flow of said slurry to the surface of said screen,
   (e) said nozzle means including a cylindrical housing mounted on said screen unit and extending transversely of said screen surface adjacent one end thereof and having a longitudinally extending discharge opening,
   (f) valve means contained within said nozzle housing and including a tubular rotatable member having spaced inlet and outlet longitudinal slot openings aligned respectively with the discharge of said feed input means and with said discharge opening in said nozzle housing, and
   (g) control means connected to said rotatable valve member for rotating said member to selectively vary the size of said pair of aligned openings and the velocity of flow of said liquid-solids slurry through said nozzle means to said screen surface.

2. The screen unit of claim 1 wherein said nozzle means include a spout extending transversely of the feed end of said screen surface and provided with a longitudinal opening extending the length thereof for distributing the liquid-solids feed slurry discharge from said nozzle housing to said screen surface in an uninterrupted flow transversely of said feed end of said screen surface.

3. The screen unit of claim 2 wherein said spout comprises a depending wall portion of said tubular valve member projecting outwardly of said nozzle housing and a depending wall of said nozzle housing.

4. The screen unit of claim 3 wherein said control means comprise an actuator member attached to said depending wall of said valve member and wherein said actuator member is operable upon rotation of said valve member to move said latter wall portion between spaced limit positions toward and away from said depending wall of said nozzle housing to vary the size of said spout opening.

5. The screen unit of claim 4 wherein said movement of said depending valve wall portion to vary the size of said spout opening simultaneously varies the size of the opening between said valve inlet slot and said slurry feed input means.

6. The screen unit of claim 4 wherein said actuator member comprises a rod having one end pivotally secured to said depending wall of said valve member, a collar member secured to said screen unit, and wherein the opposite end of said rod is rotatably mounted for reciprocating movement in said collar member, clamp means for securing said collar to said screen unit and locking means to release said clamp means from said screen unit to fully open said spout.

7. The screen unit of claim 6 wherein said clamp means is provided with a clamp end detented to said screen unit and wherein said releasable locking means comprising a locking nut on said actuator rod.

8. The screen unit of claim 4 wherein said actuator member includes a pneumatic piston assembly having a piston and piston rod, said rod pivotally connected to said depending valve spout wall, and a piston casing for housing said piston pivotally mounted on said screen unit.

9. The screen unit of claim 8 wherein said pneumatic piston is adapted to be connected to a pneumatic source for operating said piston to selectively reciprocate said piston rod to rotate said valve member to vary the size of the spout opening at predetermined time intervals.

* * * * *